United States Patent
Skofljanec (10) Patent No.: US 6,927,522 B2
(45) Date of Patent: Aug. 9, 2005

(54) POWER SUPPLY UNIT

(75) Inventor: Robert Skofljanec, Moos (DE)

(73) Assignee: Alcoa Fujikura Gesellschaft mit beschraenkter Haftung, Frickenhausen (DE)

( * ) Notice: Subject to any disclaimer, the term of this patent is extended or adjusted under 35 U.S.C. 154(b) by 0 days.

(21) Appl. No.: 10/774,745

(22) Filed: Feb. 9, 2004

(65) Prior Publication Data

US 2004/0195928 A1 Oct. 7, 2004

(30) Foreign Application Priority Data

Feb. 11, 2003 (DE) .......................................... 103 06 692

(51) Int. Cl.$^7$ .............................................. H02K 39/38
(52) U.S. Cl. ............................ 310/239; 310/71; 310/89
(58) Field of Search .......................... 310/51, 71, 68 R, 310/89, 233, 239

(56) References Cited

U.S. PATENT DOCUMENTS

| | | |
|---|---|---|
| 4,840,222 A | 6/1989 | Lakin et al. |
| 5,194,769 A * | 3/1993 | Ade et al. ..................... 310/51 |
| 6,031,306 A | 2/2000 | Permuy |
| 6,734,589 B2 * | 5/2004 | Kogure et al. ................ 310/89 |

FOREIGN PATENT DOCUMENTS

| | | |
|---|---|---|
| DE | 197 36 300 | 4/1998 |
| DE | 101 33 767 | 1/2003 |
| EP | 1 022 210 | 7/2000 |

* cited by examiner

*Primary Examiner*—Thanh Lam
(74) *Attorney, Agent, or Firm*—Lipsitz & McAllister, LLC (57) ABSTRACT

In order to improve a power supply unit for a commutator of an electric motor, comprising a brush holder support with brushes arranged in it and interacting with the commutator, in such a manner that this can be produced as inexpensively and in as functionally reliable a manner as possible it is suggested that the power supply unit comprise an electronics housing which is formed by the brush holder support and a protective cover connected to it and that the electronics housing seal an electronic circuit module arranged in an interior thereof in a functionally reliable manner in relation to the surroundings.

34 Claims, 8 Drawing Sheets

Fig. 7

POWER SUPPLY UNIT

The present disclosure relates to the subject matter disclosed in German application No. 103 06 692.6 of Feb. 11, 2003, which is incorporated herein by reference in its entirety and for all purposes.

BACKGROUND OF THE INVENTION

The invention relates to a power supply unit for a commutator of an electric motor, comprising a brush holder support with brushes arranged in it and interacting with the commutator.

Power supply units of this type are known from the state of the art. Normally, power supply units of this type are inserted into a motor housing of an electric motor.

In addition, power supply units of this type are designed such that an electric and/or electronic circuit module is also associated with them, wherein electric and/or electronic circuit modules of this type have to be embedded in a casting compound for reasons of the protection of the electronic circuit in order to prevent the access of moisture and also dirt to the components.

Such embedding of electric and/or electronic circuit modules in an embedding compound, preferably resin, does, however, have the disadvantage that a number of disadvantages result therefrom.

Disadvantages of this type are, for example, the costs of such casting compounds which are required, in particular, for rough ambient conditions.

The object underlying the invention is therefore to improve a power supply unit of the generic type in such a manner that this can be produced as inexpensively and in as functionally reliable a manner as possible.

SUMMARY OF THE INVENTION

This object is accomplished in accordance with the invention, in a power supply unit of the type described at the outset, in that the power supply unit comprises an electronics housing which is formed by the brush holder support and a protective cover connected to it and that the electronics housing seals an electronic circuit module arranged in an interior thereof in a functionally reliable manner in relation to the surroundings.

The advantage of the inventive solution is given by the fact that it is possible to reduce the costs of the casting compounds due to the sealing electronics housing. This results, on the one hand, in the solution being more assembly-friendly and less expensive; on the other hand, further disadvantages of the known casting compounds are avoided and so the inventive solution is lighter in comparison with the use of a casting compound, may be recycled easily, has a higher resistance in relation to reagents over the entire temperature range and, in addition, a higher resistance to changes in temperature exists and so the inventive electronic circuit module is better protected and, therefore, even more functionally reliable.

As a result, it is possible with the inventive solution to integrate the power supply unit into an electric motor and also ensure its permanent functional reliability in the case of ambient conditions typical for motor vehicles.

A functionally reliable closure of the circuit module in relation to the surroundings by the electronics housing is to be understood such that the electronics housing prevents the infiltration at least of dirt particles and moisture. It is, however, even more advantageous when the electronics housing surrounds the circuit module essentially in a fluid-tight and/or gas-tight manner.

One particularly advantageous inventive solution provides, in addition, for the brushes arranged in the brush holder support to be arranged outside the interior formed by the electronics housing. This solution is of advantage because wear and tear always results on account of the interaction between the brushes and the commutator and this likewise leads to deposits of dirt which should not, however, settle in the interior and, therefore, in the area of the electronic circuit module.

One particularly advantageous embodiment of the electronics housing provides for this to extend in an annular shape around a receiving chamber for the commutator so that, as a result, a particularly compact mode of construction which can be integrated easily into an electric motor is possible for the power supply unit and contributes, altogether, to a small constructional width of the electric motor.

With respect to the design of the brush holder support, no further details have so far been given. One advantageous embodiment, for example, provides for the brush holder support to be produced from a material which is electrically non-conductive, preferably from a plastic material so that, on the one hand, the brush holder support can be produced inexpensively and, on the other hand, the brush holder support can accommodate and mount the brushes at the same time as an insulating member.

Furthermore, the brush holder support is preferably designed such that it has a supporting plate which extends transversely to the axis of rotation of the commutator and is, in particular, arranged such that it encloses the commutator.

With such a design of the brush holder support, it is preferably provided for the brush holder support to have brush channels which are arranged on a side of the supporting plate facing the protective cover and are surrounded by channel housings so that a particularly space-saving mode of construction of the circuit module can be realized by means of this arrangement.

In addition, it is preferably provided for the brush holder support to have an annular member surrounding the receiving chamber for the commutator.

In this respect, the annular member is preferably designed such that it has the brush channels passing through it and so the brushes project beyond the annular member radially inwards in the direction of the axis of rotation and can interact with the commutator.

With respect to the arrangement of the protective cover, no further details have likewise been given in conjunction with the preceding explanations concerning the individual embodiments. One advantageous embodiment provides, for example, for the protective cover to extend radially to an axis of rotation of the commutator outside the receiving chamber for the commutator in order to likewise make, in particular, a compact mode of construction of the power supply unit possible with, in particular, a small constructional width.

In this respect, the protective cover is expediently designed such that it surrounds the receiving chamber for the commutator with an inner wall.

It is favorable with this solution when the inner wall extends in continuation of the annular member of the brush holder support so that an optimum, space-saving-mode of construction of the electronics housing can be realized.

In order to ensure the necessary sealing, it is expediently provided for the inner wall to abut in a sealed manner on the annular member of the brush holder support.

In addition, it is preferably provided for the protective cover to have an outer wall which expediently closes the interior of the electronics housing in relation to the motor housing.

In this case, as well, it is advantageously provided for the outer wall to terminate in a sealed manner with the supporting plate of the brush holder support and, therefore, the required, hermetic closure of the interior in relation to the surroundings can also be realized in the area of use between the outer wall and the supporting plate.

In order to ensure the required, sealed and functionally reliable closure of the interior of the electronics housing in relation to the surroundings, it is, in addition, necessary for the protective cover to be connected securely to the brush holder support. This may be realized in the most varied of ways, for example, by means of various types of connecting elements.

One particularly favorable type of connection provides for the outer wall of the protective cover to be fixed to the supporting plate of the brush holder support.

One possibility of attaching protective cover and brush holder support which is particularly simple to realize results via this fixing of the protective cover with the outer wall to the supporting plate of the brush holder support.

The connection between the protective cover and the brush holder support can, for example, be a crimp connection.

This fixing in place may be realized particularly easily from the point of view of manufacturing techniques in that the protective cover is fixed to the supporting plate of the brush holder support with a bead so that assembly without additional fixing elements, such as, for example, screws, is, in particular, possible.

In this respect, a bead forms a particularly simple and inexpensive possibility of providing a closure between the protective cover and the brush holder support which ensures the sealing tightness required for the functional reliability of the circuit module.

The bead can extend in sections in azimuthal direction or also essentially circumferentially.

The connection between the protective cover and the brush holder support may be provided in an even more functionally reliable manner when a seal is arranged between the protective cover and the supporting plate of the brush holder support and this is preferably arranged in the area of the bead.

In addition, a seal is also expediently provided in the area of the part of the cover adjoining the annular member of the brush holder support, in particular, at the transition from the annular member to the inner wall of the protective cover, wherein the required pressure for the seal between the annular member and the inner wall of the protective cover can also be generated at the same time by the connection of the protective cover to the supporting plate and so no additional measures are required in this area for fixing the protective cover in place relative to the brush holder support.

Since the electronic circuit module is normally provided with power components which generate heat, provision must be made for a good discharge of the heat generated by the power components of the circuit module.

For example, a discharge of heat via the brush holder support would be possible, wherein this is problematic to the extent that heat results in any case in the area of the brush holder support on account of the brushes abutting on the commutator.

For this reason, it is preferably provided for the protective cover to form a cooling member for at least one power component of the circuit module.

A power component within the meaning of the present invention is to be understood as any component tending to heat up on account of the converted electrical power; power components of this type are, in particular, power semiconductors, such as semiconductor switches or semiconductor diodes.

In order to generate an optimum transfer of heat from the at least one power component to the protective cover, it is preferably provided for the at least one power component to abut on the protective cover acted upon by a force.

In this respect, the protective cover can be arranged such that it also has, for example, a cooling finger extending towards the power component.

For reasons of expense, it is, however, particularly simple and advantageous when the at least one power component abuts with its cooling member on an inner side of the protective cover.

In the case of a plurality of power components it is preferably provided for these to be arranged such that they can be brought into heat contact with the protective cover, in particular, an outer wall thereof.

The at least one power component is preferably arranged such that it abuts on a heat contact point of the protective cover provided for it so that a defined contact point on the protective cover ensures an optimum transfer of heat.

A particularly expedient solution provides for the at least one power component to abut with its cooling member on a flattened area of the inner side of the protective cover.

In this respect, the flattened area is preferably arranged on the inner side of the outer wall of the protective cover.

In order to ensure a good heat contact between the cooling member and the protective cover it is preferably provided for the protective cover to be provided with arms which protrude into the interior and between which the cooling member of the at least one power component is located.

The transfer of heat may be improved even more by means of such arms. It is even more advantageous when the arms fix the cooling member of the at least one power component on the protective cover by means of arm ends bent over in the direction of the cooling member of the at least one power component. A permanent heat contact between the cooling member and the protective cover is ensured by this fixing without additional fixing elements being necessary for this purpose.

It is particularly expedient when the arms hold the cooling member pressed against the protective cover with their bent arm ends.

With respect to the design of the protective cover itself, no further details have been given in conjunction with the preceding explanations concerning the individual embodiments. It would be conceivable, for example, to produce the protective cover from a material which is a good thermal conductor.

In this respect, metal is recommendable for the protective cover as a particularly inexpensive and suitable material.

In order to be able to realize a simple connection between the protective cover and the brush holder support which is, in particular, inexpensive to produce with this material of the protective cover, it has proven to be expedient when the protective cover is produced from a plastically deformable metal.

It is recommended, in particular, for reasons of the saving on weight when the protective cover is produced from a light metal.

Aluminum is used, for example, in some embodiments as concrete material for the protective cover, wherein the protective cover is preferably produced from aluminum by way of extrusion.

With respect to the circuit modules arranged in the electronics housing, no further details have so far been given. It would, for example, be conceivable to accommodate the circuit module in the interior of the electronics housing in the form of several, for example, segmented plates.

For reasons of the simplification of assembly and, therefore, inexpensive production, it has proven to be advantageous when the circuit module has an annular circuit board arranged in the protective cover.

In addition, it has proven to be favorable, in particular, in order to provide good heat conduction between the power components and the protective cover when the power components are arranged on a side of the circuit board of the circuit module facing the brush holder support. In this case, the circuit board may be inserted into the protective cover and, subsequently, it is possible to provide the heat contact between the power components and the protective cover in the manner described prior to the brush holder support being placed on the protective cover.

The invention does, however, relate not only to a power supply unit for an electric motor but preferably also to an electric motor comprising a motor housing, a rotor arranged in the motor housing so as to be rotatable, a brush holder support arranged in the motor housing, wherein, in accordance with the invention, the electric motor is provided with a power supply unit which has one or several of the features described above.

In this respect, it is particularly advantageous when the protective cover in the motor housing can have cooling air, for example, in the form of a stream of cooling air flowing around it in order to ensure in this way a particularly efficient cooling of the heat transferred, in particular, from the power components to the protective cover.

In this respect, it is also conceivable, for example, to provide the protective cover, in addition, with cooling ribs projecting into the stream of cooling air.

One particularly favorable solution provides for the cooling air to pass through a space between the motor housing and the protective cover in order to cool the protective cover, in particular, on its side facing the motor housing efficiently.

Alternatively or in addition thereto, a further, advantageous embodiment provides for the cooling air to pass through the receiving chamber for the commutator.

Additional features and advantages of the invention are the subject matter of the following description as well as the drawings illustrating several embodiments.

DETAILED DESCRIPTION OF THE INVENTION

One embodiment of an inventive drive motor, for example, a fan motor, illustrated in FIGS. 1 to 4, comprises a motor housing 10, in which a rotor 12 with a rotor shaft 14 is mounted so as to be rotatable.

The rotor 12 comprises an armature 16 seated on the shaft 14 and a commutator 18 which is arranged on one side of the armature 16 and via which power is supplied by armature windings of the armature 16 which are not illustrated.

A power supply unit designated as a whole as 20 is provided in the motor housing 10 for supplying power to the commutator 18 and this unit preferably extends in an annular shape around a receiving chamber 22 for the commutator 18, wherein the receiving chamber 22 passes through the entire power supply unit 20 in the direction of an axis of rotation 24 of the rotor shaft 14.

The motor housing 10 is preferably designed in two parts and comprises an armature housing 26 and a housing cover 28 which are separated from one another by a plane of separation 30 extending at right angles to the axis of rotation 24.

Figure 1:
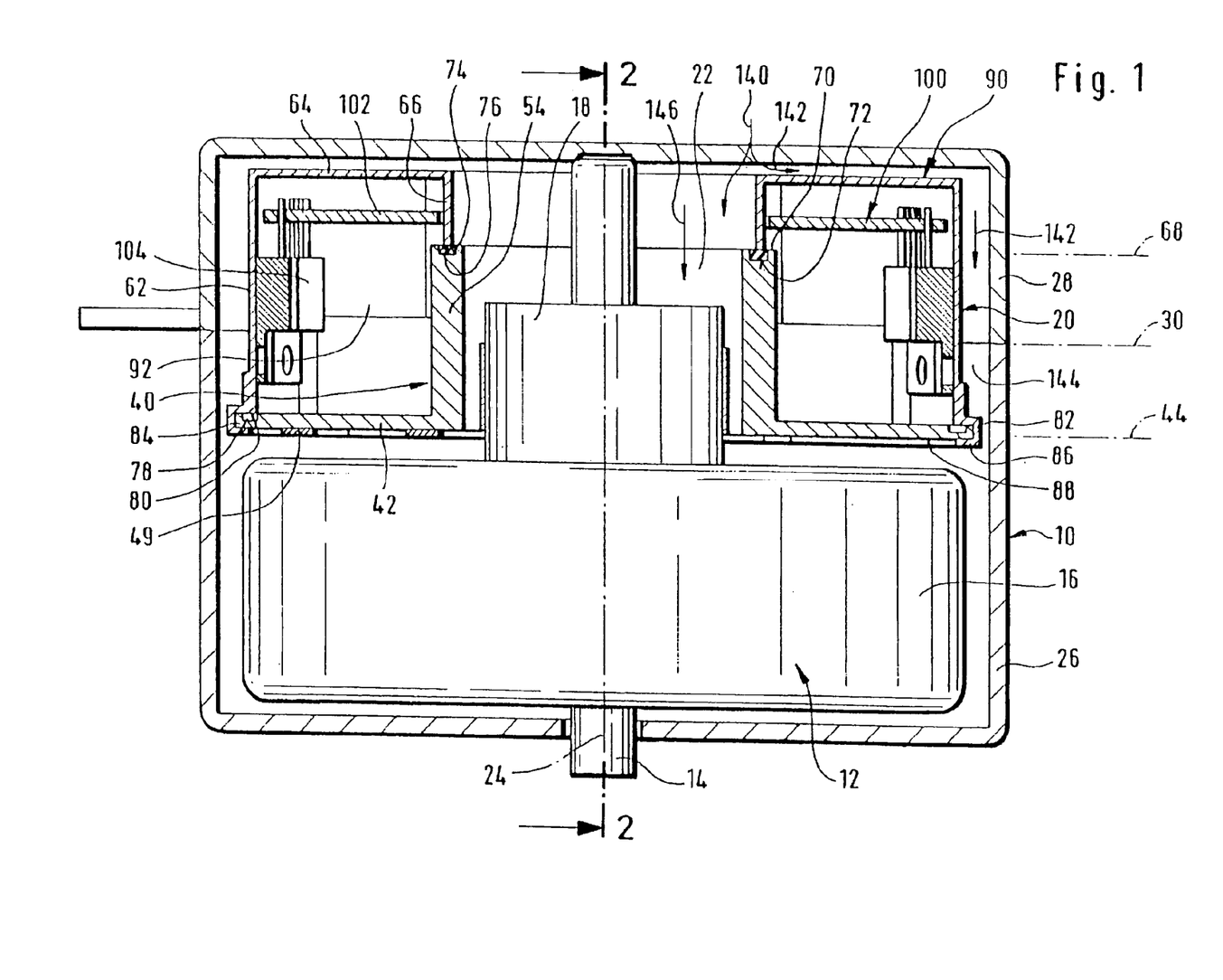
FIG. 1 shows a longitudinal section through a first embodiment of an inventive electric motor.
Figure 2:
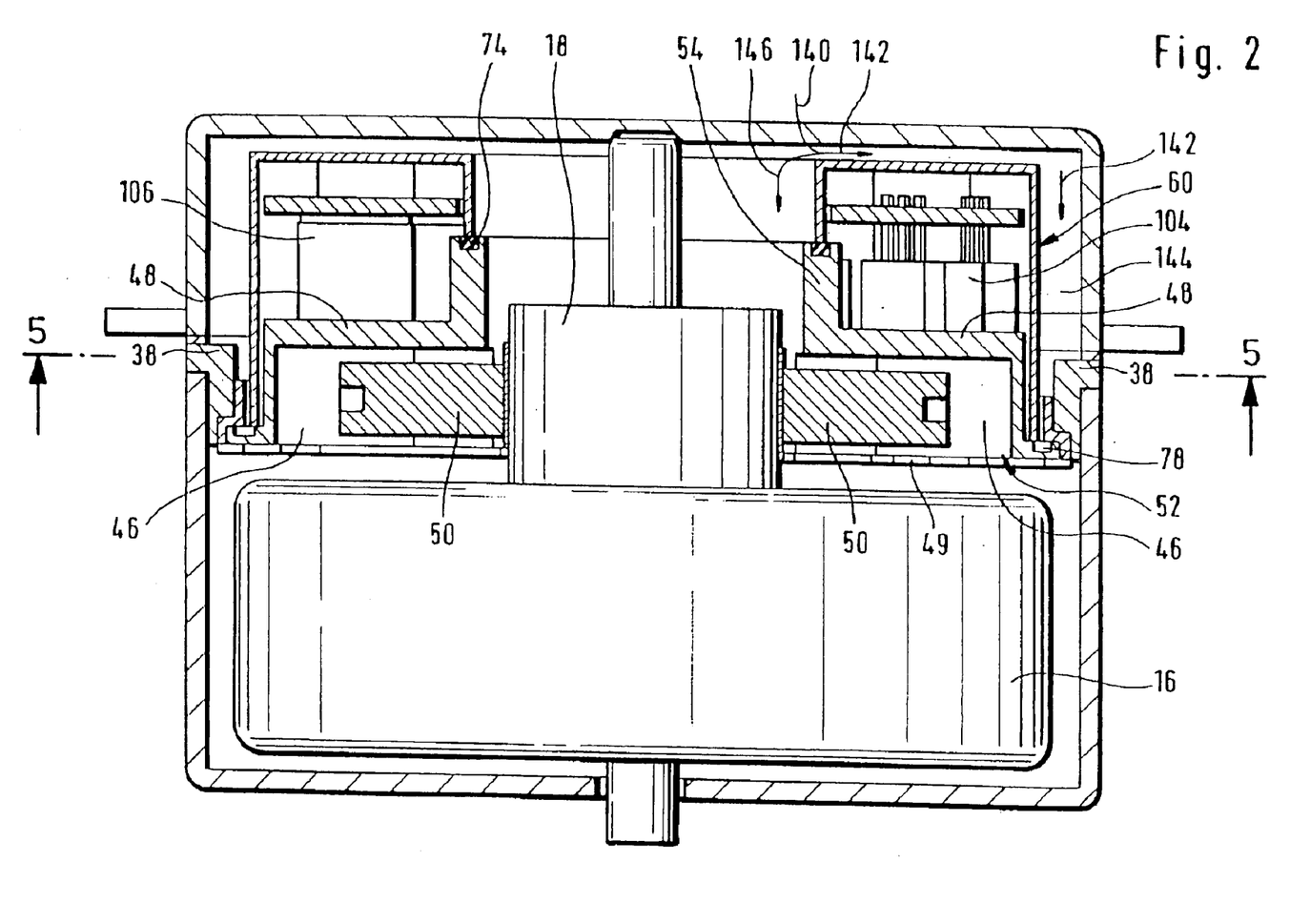
FIG. 2 shows a longitudinal section similar to FIG. 1 along line 2—2 in FIG. 1.

The power supply unit 20 comprises, as illustrated in FIGS. 1 and 2, a brush holder support which is designated as a whole as 40 and is held on the motor housing 10 via holder extensions 38. The brush holder support 40 comprises a supporting plate 42 which preferably extends in a plane 44 at right angles to the axis of rotation 24 and parallel to the plane of separation 30 and is arranged so as to face the armature 16.

Channel housings 48 are integrally formed on this supporting plate 42 of the brush holder support 40 and these housings surround brush channels 46 which are preferably open towards the armature 16 and accommodate brushes 50 or carbon brushes 50 which interact with the commutator 18 for supplying power to the commutator 18, can be moved in these brush channels 46 radially to the axis of rotation 24 and are acted upon in the direction of the commutator 18 by elastic biasing means, such as, for example, springs, which are not illustrated.

Figure 3:
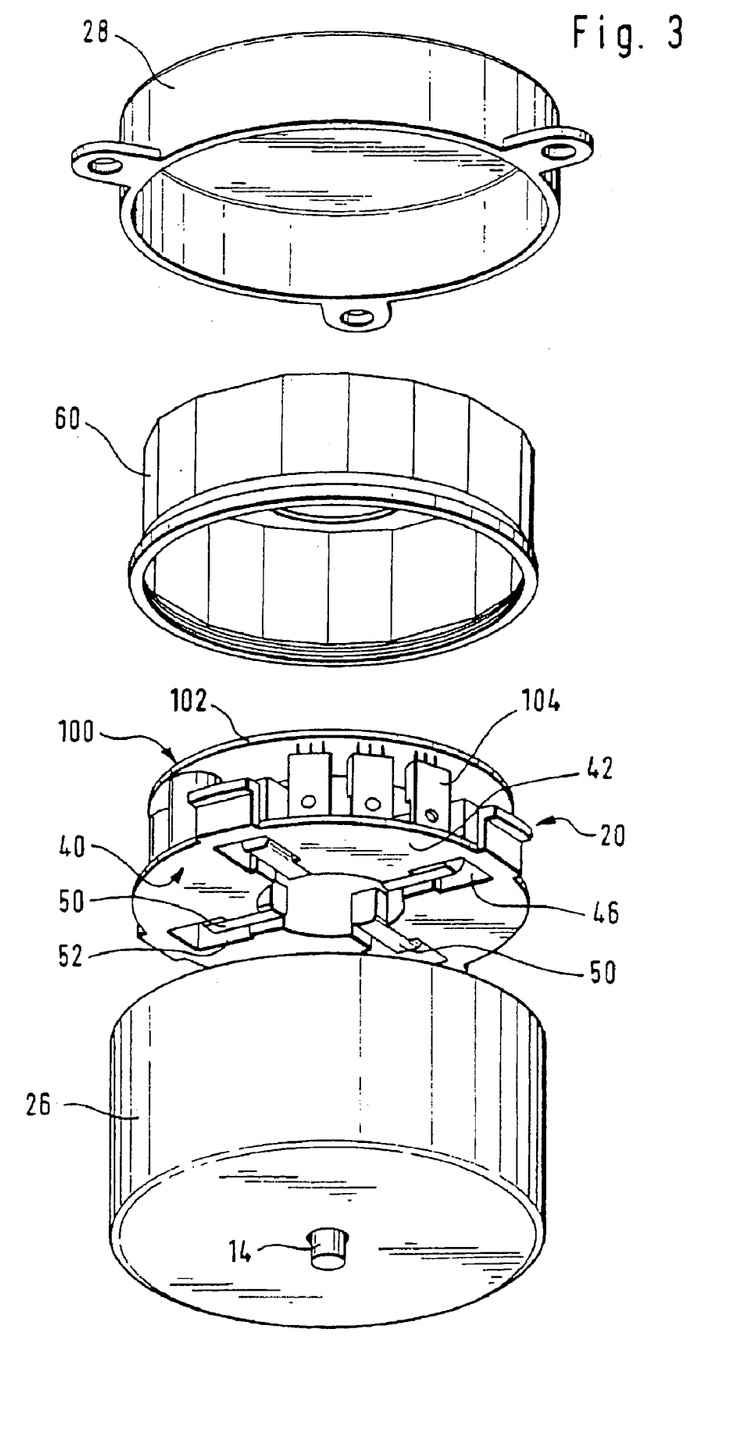
FIG. 3 shows an exploded illustration of the first embodiment of the inventive electric motor viewed from below with a protective cover removed from a power supply unit.
Figure 4:
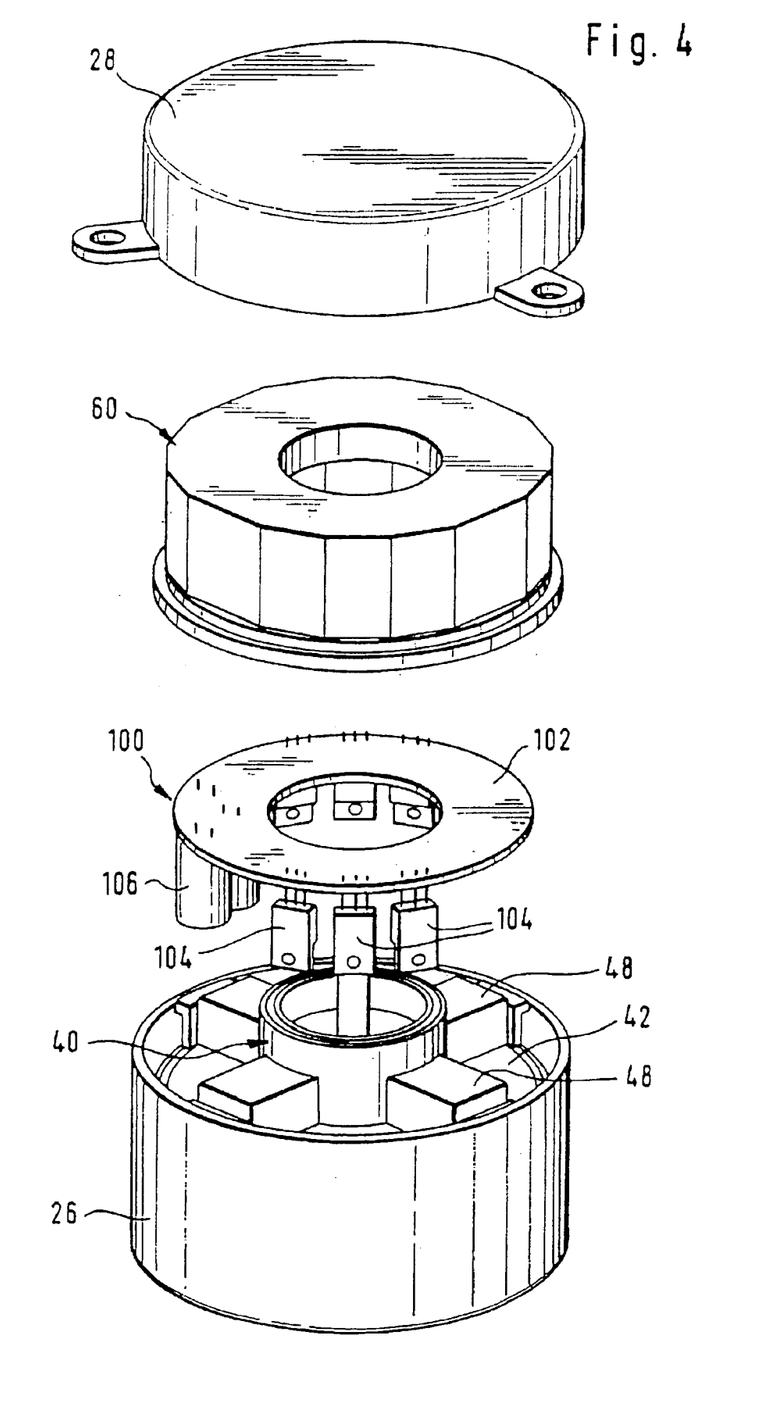
FIG. 4 shows an exploded illustration of the first embodiment of the inventive electric motor from above with a protective cover removed and a visible circuit module.

In this respect, the brush channels 46 are preferably provided towards the armature 16 with openings 52, as is apparent, in particular, from FIG. 3, so that it is possible to insert the brushes 50 into the brush channels 46 via these openings 52.

The brushes 50 themselves are contacted via path conductors realized in the form of a punched grating 49, wherein the punched grating is located on a side of the supporting plate 42 facing the armature 16.

In addition, the channel housings 48 and the supporting plate merge into an annular member 54 which is located radially outside the commutator 18 and surrounds the receiving chamber 22, wherein the brush channels 46 pass through the annular member 54 radially in relation to the axis of rotation 24 so that the brushes 50 can abut on the commutator 18 in a radial direction.

A protective cover designated as a whole as 60 can be placed on the brush holder support 40 and has an outer wall 62 which extends, proceeding from the supporting plate 42, parallel to the annular member 54 and merges into an end wall 64 which extends approximately parallel to the supporting plate 42 and which is adjoined, for example, by an inner wall 66 which extends in continuation of the annular member 54 and likewise partially surrounds the receiving chamber 22 and then extends from the end wall 64 as far as the annular member 54.

The annular member 54 is preferably provided with an end face 70 which is preferably located in a plane 68 extending at right angles to the axis of rotation 24 and has a groove 72 which extends in an annular shape and in which a seal 74 is arranged, on which the inner wall 66 rests with an end face 76 facing the annular member 54, preferably in a manner acted upon by a force.

In addition, the supporting plate 42 is provided with a groove 78 which extends circumferentially around its outer side and on which the outer wall 62 of the protective cover 60 rests with an end face 80 facing the supporting plate 42.

In order to fix the protective cover 60 in place, a bead 82 is integrally formed on the outer wall 62 in the area of the end face 80 and this bead engages in a C shape around an outer contour 84 of the supporting plate 42 and, in particular, abuts on a side 88 of the supporting plate 42 facing the armature 16 near to the outer contour 84 with a beaded flange 86.

The brush holder support 40 and the protective cover 60 together form, as a result, an electronics housing 90 of the power supply unit 20, wherein an interior 92 of the electronics housing is hermetically sealed by means of the brush holder support 40 which is designed to be moisture-tight and/or gas-tight towards the outside as well as the protective cover 60 which are, in addition, connected to one another so as to be moisture-tight and/or gas-tight and so an electronic circuit module designated as a whole as 100 can be arranged in this interior 90, in particular, a control circuit for the electric motor, preferably comprising a circuit board 102 and electronic components, inter alia electronic power components 104, in particular, power semiconductors, a processor 105 and capacitors 106, without additional protective measures for the circuit module 100 being required, such as, for example, an embedding thereof in a pouring compound, for example, a casting resin, since the electronics housing 90 provides adequate protection for the circuit module 100 with respect to external influences which would impair it, even with arrangement of the power supply unit 20 in ambient conditions customary for a motor vehicle.

The circuit board 102 is inserted into the protective cover 60 such that it is located close to the end wall 64 of the protective cover 60, wherein the circuit board 102 is preferably of an annular design and is held by the outer wall 62 and the inner wall 66 so as to be centered.

In addition, the power semiconductors 104 are arranged on a side of the circuit board 102 facing the brush holder support 40 and extend from this in the direction of the brush holder support 40.

Figure 5:
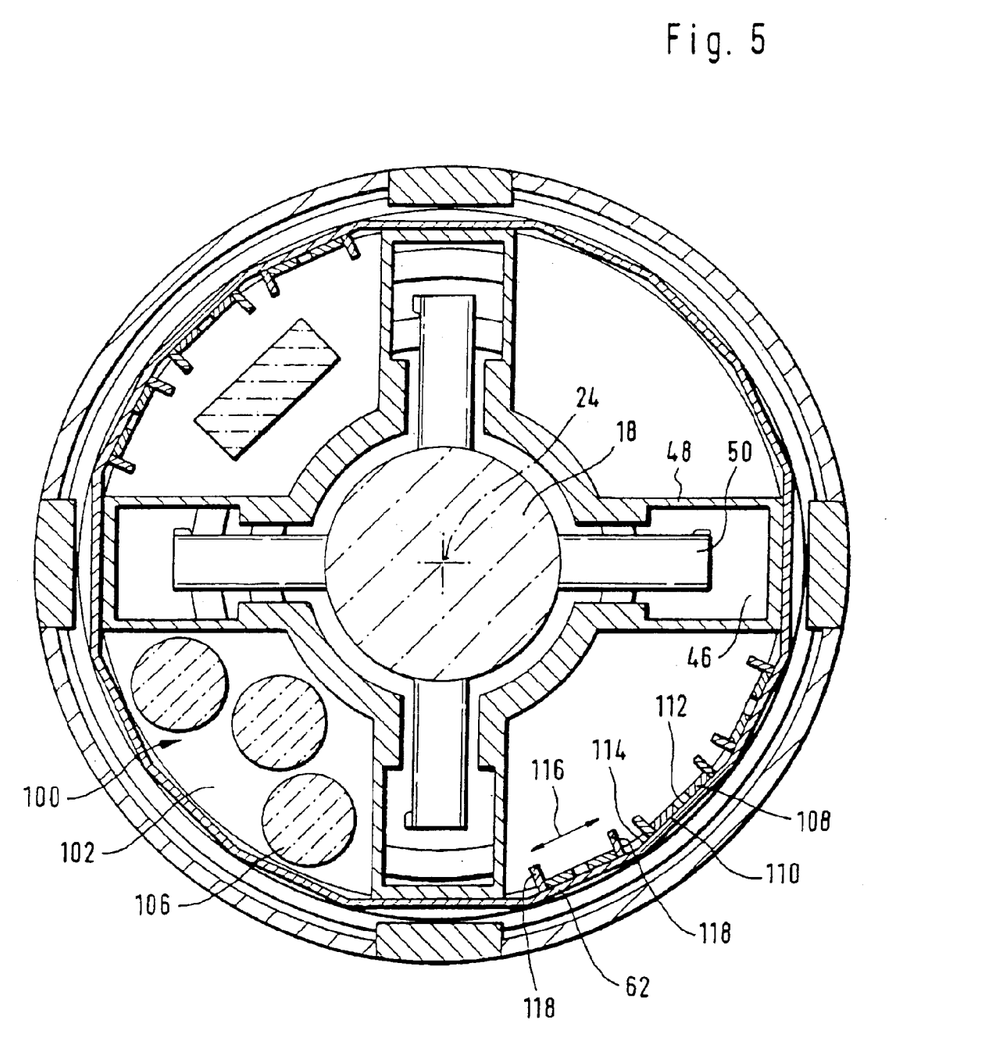
FIG. 5 shows a section along line 5—5 in FIG. 2 with arms for fixing power components not yet bent over.
Figure 6:
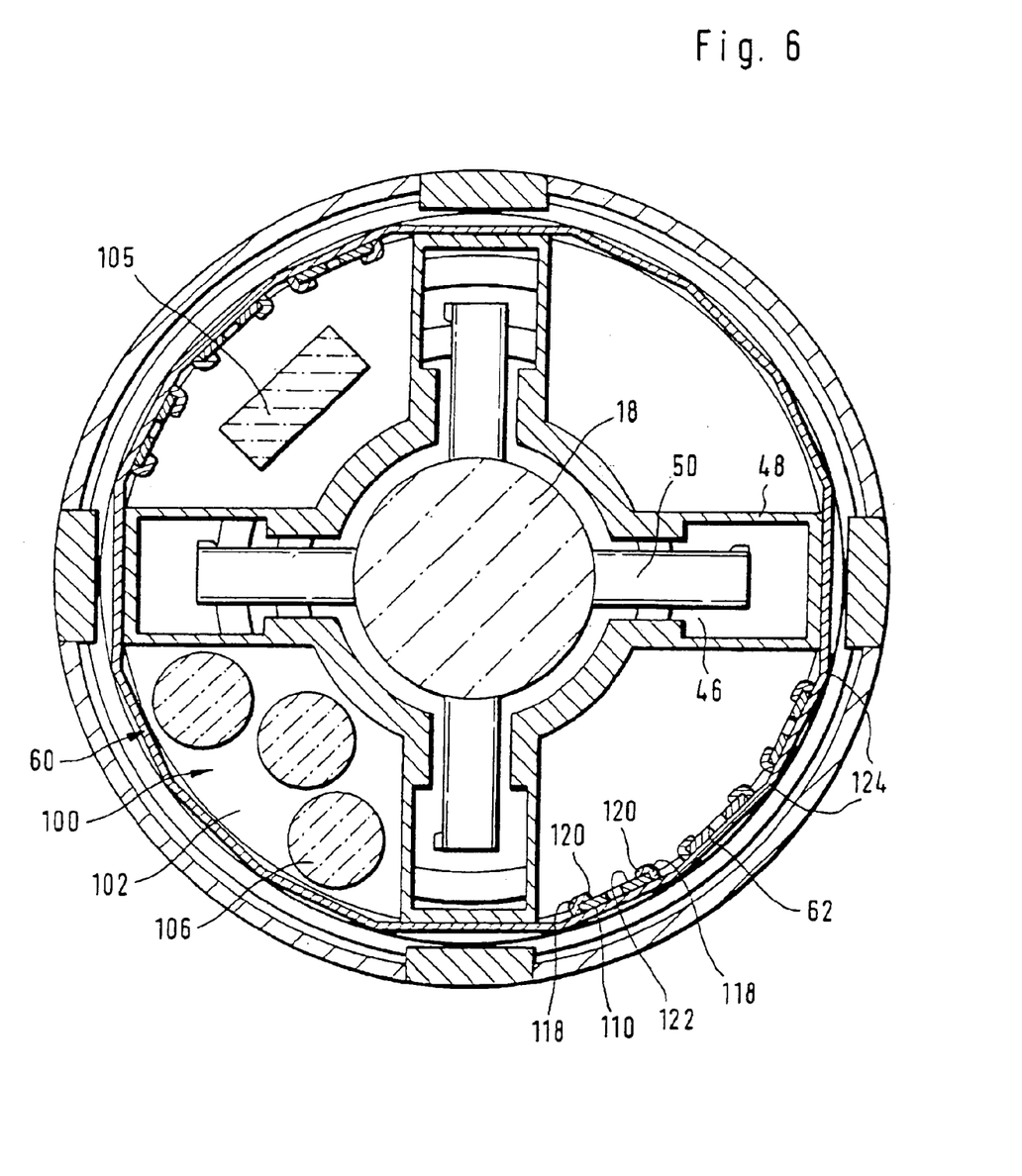
FIG. 6 shows a section according to FIG. 5 with power components fixed in place by the bent arms.

As illustrated in FIGS. 5 and 6, the power semiconductors 104 are arranged on the circuit board 102 such that they are aligned with their cooling members 108, which are provided for the purpose of cooling and preferably have flat sides 110, such that the flat sides 110 abut on flattened areas 112 of an inner surface 114 of the outer wall 62 of the protective cover 60. In order to keep the cooling members 108, in addition, in engagement on the flattened areas 112, in order to facilitate an optimum transfer of heat from the cooling member 108 to the outer wall 62, arms 118 projecting radially inwards are integrally formed on the outer wall 62 on both sides of the cooling members 108 in an azimuthal direction in relation to the axis of rotation 24 and these arms, as illustrated in FIG. 5, project first of all radially inwards and are spaced such that the circuit module 100 with the semiconductor switches 104 arranged on it and their cooling members 108 can be inserted into the protective cover 60, wherein the cooling members 108 can be pushed in between the arms 118.

A secure fixing of the cooling members 108 is brought about, as illustrated in FIG. 6, by beading the arms 118 over in such a manner that their arm ends 120 act upon the cooling members 108 on their side 122 facing away from the flat side 110 and the outer wall 62 and, therefore, press the flat side 110 of the cooling member 108 against the flattened area 112 for the respective cooling member 108 so that a permanently good transfer of heat is ensured between the cooling member 108 and the outer wall 62.

The outer wall 62 is preferably designed as a polygonal cylinder for the formation of the flattened areas 112 so that flat wall areas are automatically formed between individual edges 124 of the polygonal cylinder and have the flattened areas 112 on their inner sides.

Figure 7:
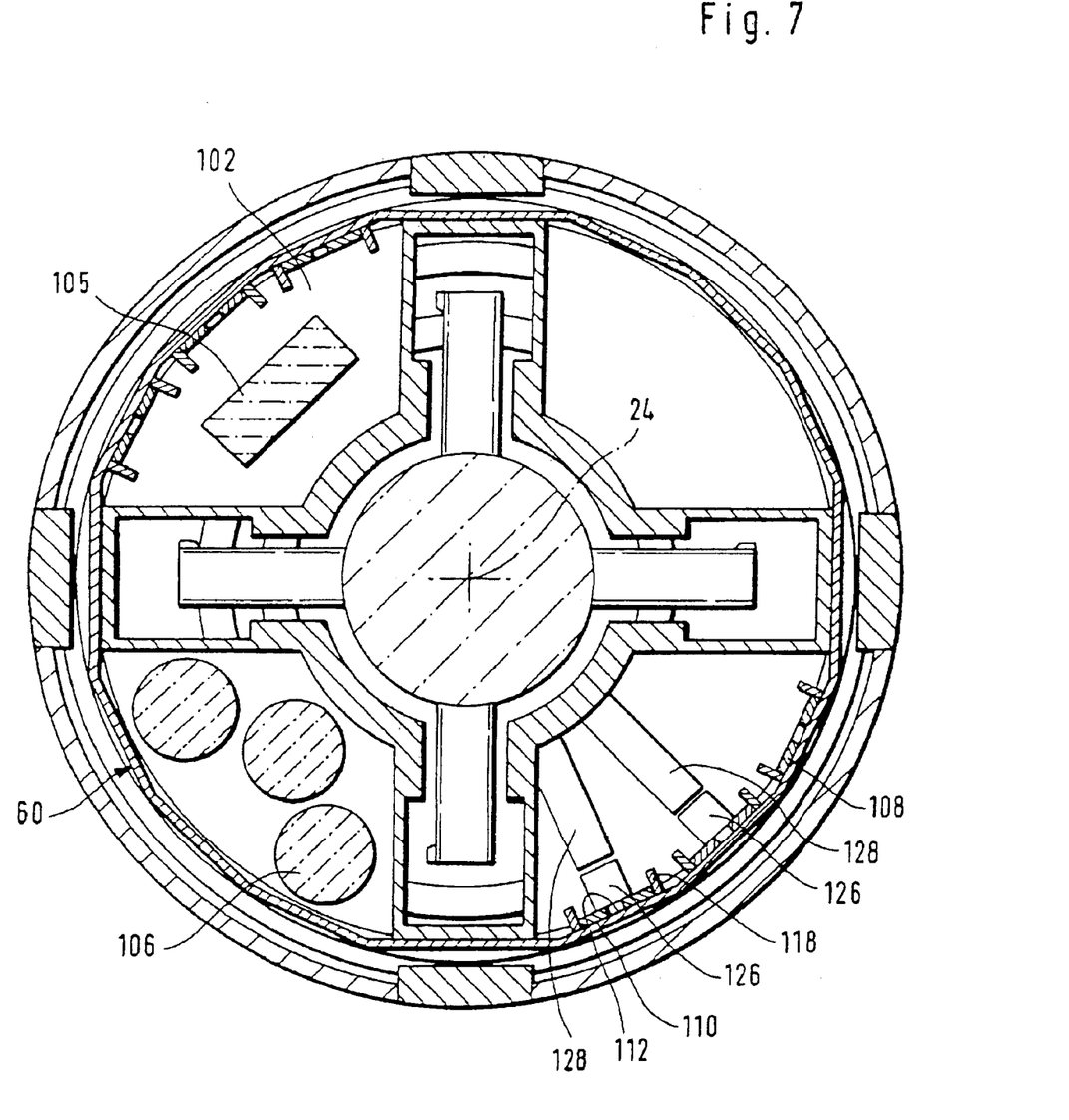
FIG. 7 shows a section similar to FIG. 5 through a second embodiment of an inventive electric motor with power components abutting on the protective cover by means of spring members and FIG. 8 shows a perspective view of an inventive power supply unit with cable harness and connector units.

In a second embodiment, illustrated in FIG. 7, a spring member 126, which is supported in relation to an abutment 128 arranged, for example, on the circuit board 102 and, therefore, keeps the cooling member 108 constantly abutting with the flat side 110 against the flattened area 112 of the outer wall 62 in a spring-like manner, is used alternatively to the arms 118 which are bent over.

As for the rest, the second embodiment is constructed in the same way as the first embodiment and so with respect to the additional elements and their functioning reference is made in full to the comments concerning the first embodiment.

Figure 8:
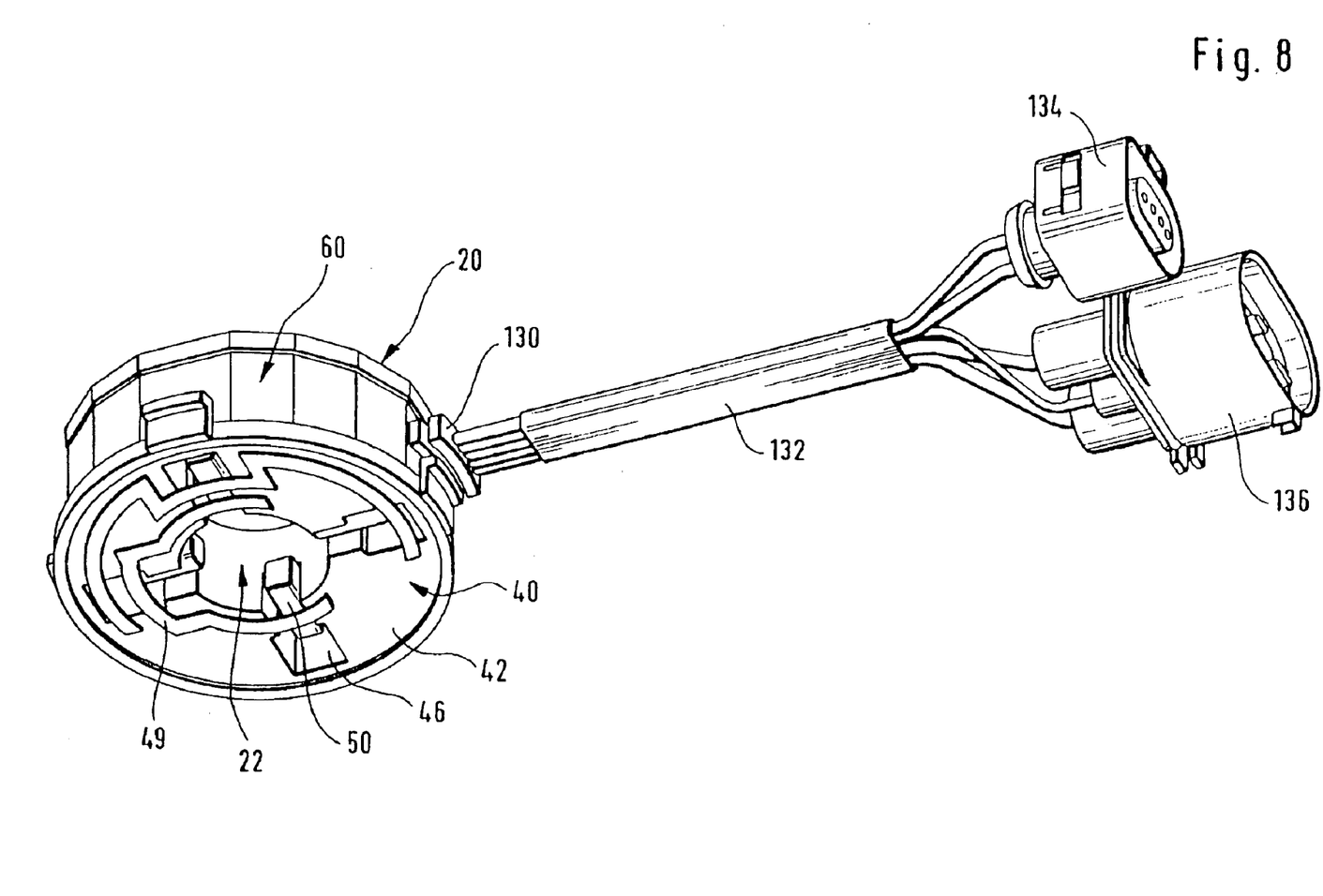

The power supply unit 20 is provided, in particular, in both embodiments, as illustrated in FIG. 8, in addition with a respective cable bushing 130, which is hermetically sealed in relation to the protective cover 60 and the brush holder support 40 and can be produced, for example, by way of the extrusion of cables guided through the protective cover 60, and with a cable harness 132 which leads away from the power supply unit 20 and leads from the power supply unit 20 to the connector units 134 and 136 which can be connected to corresponding counterparts in a motor vehicle.

The entire power supply unit 20 with the cable harness 132 and the connector units 134 and 136 can therefore be supplied as a unit assembly for an electric motor, wherein the circuit module 100 in the power supply unit 20 preferably comprises a processor 105 which activates semiconductor switches 104 as power semiconductors by way of program control in such a manner that an operation of the electric motor modulated as to pulse width is possible, wherein the pulse width modulation is brought about accordingly via sensor signals supplied to the cable harness 132 so that, for example, one of the connector units 134 or 136 provides a direct connection to a corresponding sensor.

For the purpose of cooling the protective cover 60, the electronics housing 90 is arranged in the motor housing 10 in such a manner that the protective cover 60 has a stream 140 of cooling air flowing around it which, as illustrated in FIGS. 1 and 2, flows through a space 144 between the protective cover 60 and the housing 10, in particular, the housing cover 28 with a partial stream 142 and flows through the receiving chamber 22 of the commutator 18 with a partial stream 146.

The stream 142 of cooling air flowing, in particular, around the outer wall 62 of the protective cover 40 results in a particularly efficient discharge of heat since the power semiconductors 104 abut on this and transfer heat.

What is claimed is:

1. Power supply unit for a commutator of an electric motor, comprising:
   a brush holder support;
   brushes arranged in said brush holder support and interacting with the commutator,
   an electronic circuit module, and
   an electronics housing adapted to be inserted within an outer motor housing of said electric motor, said electronics housing formed by the brush holder support and a protective cover connected to the brush holder support, the electronics housing sealing the electronic circuit module which is arranged in an interior of said electronics housing in a functionally reliable manner in relation to the surroundings within the outer motor housing of said electric motor.

2. Power supply unit as defined in claim 1, wherein the brushes arranged in the brush holder support are arranged outside the interior formed by the electronics housing.

3. Power supply unit as defined in claim 1, wherein the electronics housing extends in an annular shape around a receiving chamber for the commutator.

4. Power supply unit as defined in claim 1, wherein the brush holder support is produced from an electrically non-conductive material.

5. Power supply unit as defined in claim 1, wherein the brush holder support has a supporting plate extending transversely to an axis of rotation of the commutator.

6. Power supply unit as defined in claim 5, wherein the brush holder support has brush channels arranged on a side of the supporting plate facing the protective cover and surrounded by channel housings.

7. Power supply unit as defined in claim 1, wherein the brush holder support has an annular member surrounding a receiving chamber for the commutator.

8. Power supply unit as defined in claim 7, wherein the protective cover extends radially to an axis of rotation of the commutator outside the receiving chamber for the commutator.

9. Power supply unit as defined in claim 8, wherein the protective cover surrounds the receiving chamber for the commutator with an inner wall.

10. Power supply unit as defined in claim 9, wherein the inner wall extends in continuation of the annular member of the brush holder support.

11. Power supply unit as defined in claim 9, wherein the inner wall abuts in a sealed manner on the annular member of the brush holder support.

12. Power supply unit as defined in claim 1, wherein the protective cover has an outer wall.

13. Power supply unit as defined in claim 12, wherein the outer wall terminates in a sealed manner with the supporting plate of the brush holder support.

14. Power supply unit as defined in claim 12, wherein the outer wall of the protective cover is fixed to a supporting plate of the brush holder support.

15. Power supply unit as defined in claim 14, wherein the protective cover is fixed to the supporting plate of the brush holder support with a bead.

16. Power supply unit as defined in claim 15, wherein the bead essentially engages around an outer contour of the supporting plate.

17. Power supply unit as defined in claim 1, wherein the protective cover forms a cooling member for at least one power component of the circuit module.

18. Power supply unit as defined in claim 17, wherein the at least one power component abuts on the protective cover acted upon by a force.

19. Power supply unit as defined in claim 17, wherein the at least one power component abuts with its cooling member on an inner side of the protective cover.

20. Power supply unit as defined in claim 17, wherein the at least one power component abuts on a heat contact point of the protective cover.

21. Power supply unit as defined in claim 20, wherein the at least one power component abuts with its cooling member on a flattened area of the inner side of the protective cover.

22. Power supply unit as defined in claim 21, wherein the flattened area is arranged on an inner side of an outer wall of the protective cover.

23. Power supply unit as defined in claim 17, wherein the protective cover is provided with arms protruding into the interior, the cooling member of the at least one power component being located between said arms.

24. Power supply unit as defined in claim 23, wherein the arms fix the cooling member of the at least one power component on the protective cover by means of arm ends bent over in a direction of the cooling member of the at least one power component.

25. Power supply unit as defined in claim 23, wherein the arms hold the cooling member pressed against the protective cover with their bent arm ends.

26. Power supply unit as defined in claim 1, wherein the protective cover consists of metal.

27. Power supply unit as defined in claim 26, wherein the protective cover is produced from a plastically deformable metal.

28. Power supply unit as defined in claim 26, wherein the protective cover is produced from a light metal.

29. Power supply unit as defined in claim 1, wherein the circuit module has an annular circuit board arranged in the protective cover.

30. Power supply unit as defined in claim 17, wherein the power components are arranged on a side of a circuit board of the circuit module facing the brush holder support.

31. Electric motor comprising:
    an outer motor housing,
    a rotor having a commutator and arranged in the motor housing so as to be rotatable, and
    a power supply unit within said outer motor housing, said power supply unit comprising:
      a brush holder support with brushes arranged in said brush holder support and interacting with the commutator,
      an electronic circuit module, and
      an electronics housing within said outer motor housing, said electronics housing formed by the brush holder support and a protective cover connected to the brush holder support, the electronics housing sealing the electronic circuit module which is arranged in an interior of the electronics housing in a functionally reliable manner in relation to the surroundings within the outer motor housing of said electric motor.

32. Electric motor as defined in claim 31, wherein the protective cover is arranged in the motor housing so as to have cooling air flowing around it.

33. Electric motor as defined in claim 32, wherein the cooling air passes through a space between the motor housing and the protective cover.

34. Electric motor as defined in claim 32, wherein the cooling air passes through a receiving chamber for the commutator.

* * * * *